US012632209B2

(12) United States Patent
Yoshitomi et al.

(10) Patent No.: US 12,632,209 B2
(45) Date of Patent: May 19, 2026

(54) INFORMATION PROCESSING SYSTEM, INFORMATION PROCESSING APPARATUS, RECORDING MEDIUM, AND CONTROL METHOD

(71) Applicant: Lenovo (Singapore) Pte. Ltd., Singapore (SG)

(72) Inventors: Keiichi Yoshitomi, Kanagawa (JP); Mitsuhiro Yamazaki, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/446,477

(22) Filed: Aug. 9, 2023

(65) Prior Publication Data

US 2024/0111477 A1      Apr. 4, 2024

(30) Foreign Application Priority Data

Sep. 29, 2022      (JP) ................................. 2022-156154

(51) Int. Cl.
| | |
|---|---|
| *G06F 3/16* | (2006.01) |
| *G06F 3/01* | (2006.01) |
| *G06F 3/0354* | (2013.01) |
| *G06F 3/041* | (2006.01) |

(52) U.S. Cl.
CPC ................ *G06F 3/16* (2013.01); *G06F 3/016* (2013.01); *G06F 3/0416* (2013.01); *G06F 3/03545* (2013.01)

(58) Field of Classification Search
None
See application file for complete search history.

(56) References Cited

U.S. PATENT DOCUMENTS

| | | | | |
|---|---|---|---|---|
| 9,489,048 | B2 * | 11/2016 | Weddle ..................... | G06T 7/60 |
| 10,809,822 | B2 * | 10/2020 | Akama ................... | G06F 3/039 |
| 2007/0097073 | A1 * | 5/2007 | Takashima .............. | G06F 3/016 |
| | | | | 345/156 |
| 2007/0129828 | A1 * | 6/2007 | Lee ...................... | H03G 3/3089 |
| | | | | 700/94 |
| 2008/0062145 | A1 * | 3/2008 | Shahoian ............ | G06F 3/03547 |
| | | | | 345/173 |

(Continued)

FOREIGN PATENT DOCUMENTS

| | | |
|---|---|---|
| CN | 104471522 A | 3/2015 |
| CN | 104898825 A | 9/2015 |

(Continued)

*Primary Examiner* — Matthew Yeung
(74) *Attorney, Agent, or Firm* — Osha Bergman Watanabe & Burton LLP

(57) ABSTRACT

An information processing system includes an information processing apparatus and an input device, where the input device includes a vibrating unit, the information processing apparatus includes a touch sensor and a display unit, and the touch sensor and the display unit are superimposed on each other. A controller of the information processing apparatus or the input device supplies, to the vibrating unit, a drive signal obtained by synthesizing a vibration component and a sound component in response to contact of the input device with the touch sensor, and determines output characteristics of the sound component based on an acoustic environment of the information processing apparatus.

13 Claims, 7 Drawing Sheets

(56)  References Cited

U.S. PATENT DOCUMENTS

| | | | | |
|---|---|---|---|---|
| 2010/0160041 A1* | 6/2010 | Grant | .................... | G06F 3/0485 |
| | | | | 463/31 |
| 2015/0253851 A1 | 9/2015 | Oh et al. | | |
| 2016/0048209 A1* | 2/2016 | Park | .................... | A63F 13/2145 |
| | | | | 345/173 |
| 2017/0201844 A1* | 7/2017 | Smith | .................... | H04R 29/00 |
| 2019/0310734 A1* | 10/2019 | Hotelling | .............. | G06F 3/0443 |
| 2021/0232237 A1* | 7/2021 | Alfano | .................. | G06F 3/0346 |
| 2023/0081403 A1* | 3/2023 | Pelissier | ................. | G06F 3/016 |
| | | | | 345/177 |

FOREIGN PATENT DOCUMENTS

| | | | |
|---|---|---|---|
| JP | 2006031410 A | 2/2006 |
| JP | 2007122501 A | 5/2007 |
| JP | 2014222492 A | 11/2014 |
| JP | 2015057659 A | 3/2015 |
| JP | 2015-215712 A | 12/2015 |
| JP | 2017-228173 A | 12/2017 |
| JP | 2019-185339 A | 10/2019 |
| JP | 2022-115288 A | 8/2022 |
| WO | 2008078523 A1 | 7/2008 |
| WO | 2021124906 A1 | 6/2021 |

* cited by examiner

S1     30     CS1     DF     20 (21, 22)     1

INFORMATION PROCESSING SYSTEM, INFORMATION PROCESSING APPARATUS, RECORDING MEDIUM, AND CONTROL METHOD

CROSS-REFERENCE TO RELATED APPLICATIONS

This application claims priority to Japanese Patent Application No. 2022-156154 filed on Sep. 29, 2022, the contents of which are hereby incorporated herein by reference in their entirety.

BACKGROUND

Technical Field

The present invention relates to control of an input device, and includes an information processing system, an information processing apparatus, a recording medium storing a program, and a control method.

Description of Related Art

A haptic pen is a digital pen having a haptic feedback function. The digital pen is an input device used to display and record handwriting characters and the like on and in an information processing apparatus. The digital pen is also called an electronic pen, a smart pen, a stylus, or the like. The haptic feedback is realized by vibrating a vibrating body in response to contact with a touch panel to display characters and the like. The improvement of writing comfort is being attempted by having the haptic feedback function. In the haptic pen, it is also being attempted to simulate vibration caused by mechanical contact of a writing instrument with paper.

For example, in Japanese Unexamined Patent Application Publication (Translation of PCT Application) No. 2017-537395, there is disclosed an interactive stylus including a stylus body having a first end, where the first end is configured to provide a first function and a second function when used by a user. The interactive stylus further includes a controller configured to drive the first end so as to capacitively couple the first end with an electrode matrix of an interactive display device. The capacitive coupling is associated with the first function, and the second function is disabled in response to automatically sensing a user's intent to use the first function without any explicit user input. The interactive stylus is included in the stylus body, and further has a haptic actuator associated with the second function. Disabling the second function includes the meaning of preventing the operation of the haptic actuator.

However, it is generally difficult to reproduce the same feeling as using a mechanical writing instrument such as a ballpoint pen only by simulating the vibration. Upon writing, various kinds of stimuli such as sounds other than vibration occur. It is probably because the user feels comfortable in writing by taking these stimuli together. Therefore, the feeling of use of the haptic pen is not always improved.

SUMMARY

The present invention has been made to solve the above problem, and an information processing system according to the first aspect of the present invention includes an information processing apparatus and an input device, where the input device includes a vibrating unit, the information processing apparatus includes a touch sensor and a display unit, and the touch sensor and the display unit are superimposed on each other, wherein a controller of the information processing apparatus or the input device supplies, to the vibrating unit, a drive signal obtained by synthesizing a vibration component and a sound component in response to contact of the input device with the touch sensor, and determines the output characteristics of the sound component based on an acoustic environment of the information processing apparatus.

In the above information processing system, the controller may determine the intensity of the sound component according to a sound volume setting for the input device.

In the above information processing system, when a silent mode is set, the controller may stop the output of the sound component.

The above information processing system may also be such that the information processing apparatus further includes a speaker, and when the sound volume from the speaker exceeds a predetermined reference volume, the controller stops the output of the sound component.

The above information processing system may further be such that the information processing apparatus further includes a sound collecting unit which collects ambient sounds, and the controller determines the intensity of the sound component based on the intensity of sounds collected by the sound collecting unit.

An information processing apparatus according to the second aspect of the present invention includes a controller, a touch sensor, and a display unit, where the touch sensor and the display unit are superimposed on each other, wherein the controller supplies, to a vibrating unit of an input device, a drive signal obtained by synthesizing a vibration component and a sound component in response to contact of the input device with the touch sensor, and determines the output characteristics of the sound component based on an acoustic environment of the own apparatus.

A non-transitory computer-readable recording medium storing a program according to the third aspect of the present invention, the program causing a computer to function as the above information processing apparatus.

A control method according to the fourth aspect of the present invention is a control method for an information processing system including an information processing apparatus and an input device, where the input device includes a vibrating unit, the information processing apparatus includes a touch sensor and a display unit, and the touch sensor and the display unit are superimposed on each other, the control method including: a step of causing a controller of the information processing apparatus or the input device to supply, to the vibrating unit, a drive signal obtained by synthesizing a vibration component and a sound component in response to contact of the input device with the touch sensor; and a step of causing the controller to determine the output characteristics of the sound component based on an acoustic environment of the information processing apparatus.

The above-described aspects of the present invention can improve the feeling of use of the input device by presenting sounds together with vibration according to the acoustic environment.

DETAILED DESCRIPTION

Figure 1:
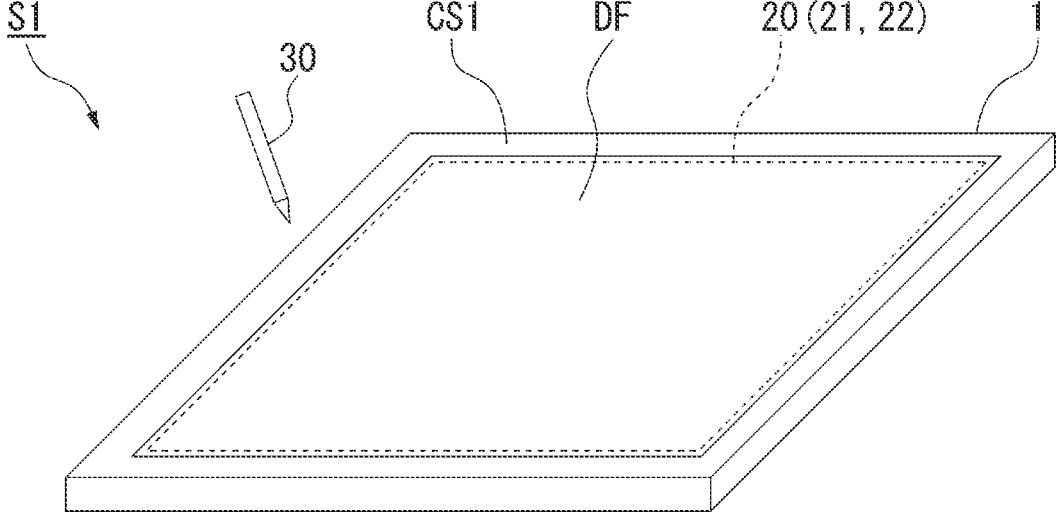
FIG. 1 is a perspective view illustrating an appearance configuration example of an information processing system according to the present embodiment.

An embodiment of the present invention will be described below with reference to the accompanying drawings. First, a configuration example of an information processing system S1 according to the present embodiment will be described. In the following, such a case that an information processing apparatus 1 is a tablet terminal and an input device 30 is a digital pen having a tactile presentation function will be mainly described. The digital pen is a pen-shaped operating medium, which can be configured as a writing device. In the present application, the digital pen may be simply called a "pen." FIG. 1 is a perspective view illustrating an appearance configuration example of the information processing system S1 according to the present embodiment. The information processing system S1 includes the information processing apparatus 1 and the input device 30.

The information processing apparatus 1 has a flat shape with a thin thickness compared to the width and the height. The information processing apparatus 1 has a chassis CS1 and a touch screen 20 on one main surface of the chassis CS1 (in the following description, the main surface may also be called the "surface"). The touch screen 20 covers the surface of the chassis CS1. The outer periphery of the touch screen 20 is supported on the chassis CS1. In the chassis CS1, other members of the information processing apparatus 1 are housed.

The input device 30 is held by a user and moved while approaching or touching the surface of the touch screen 20, thus being used for data input or editing of characters, symbols, figures, and the like. The touch screen 20 includes a display unit 21 and a touch sensor 22 (to be described later). The display unit 21 visibly displays various information on a display screen DF placed on the surface thereof. The touch sensor 22 is superimposed on the surface of the display unit 21. The touch sensor 22 detects input operation of the input device 30 on the surface thereof. The information processing apparatus 1 monitors the presence or absence of input operation, identifies each position where the input operation is detected, and executes data input or editing based on the input operation. For example, the information processing apparatus 1 displays, on the display screen DF, a trajectory of touch positions on the touch sensor 22.

The input device 30 includes a vibrating unit 55 (to be described later). The information processing apparatus 1 detects an acoustic environment of the own apparatus, and determines the output characteristics of a sound component based on the detected acoustic environment.

For example, the information processing apparatus 1 determines the intensity of the sound component according to the volume setting for the input device 30. The information processing apparatus 1 may set the necessity of sound output for presentable devices that are connected to the own apparatus and allow sounds to be presented all at once. In this case, the information processing apparatus 1 also applies the necessity of sound output to the input device 30.

Figure 2:
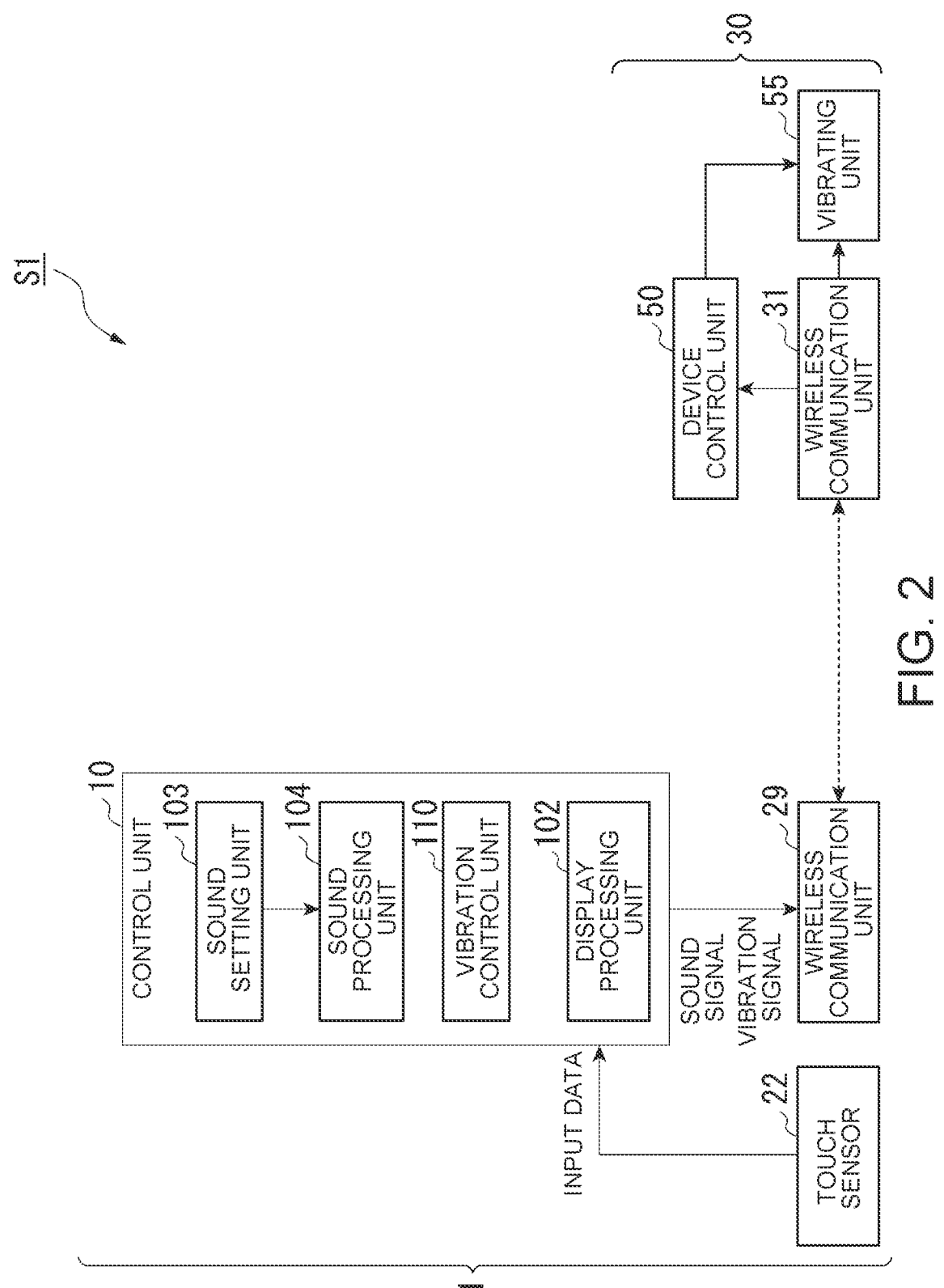
FIG. 2 is a block diagram illustrating a schematic configuration example of the information processing system according to the present embodiment.

Next, a schematic configuration example of the information processing system S1 according to the present embodiment will be described. FIG. 2 is a block diagram illustrating the schematic configuration example of the information processing system S1 according to the present embodiment. The information processing system S1 includes the information processing apparatus 1 and the input device 30.

The information processing apparatus 1 includes a control unit 10, the touch sensor 22, and a wireless communication unit 29. The touch sensor 22 detects a touch on the display screen DF or approach (hovering) within a certain distance to the display screen DF as input operation of the input device 30, and identifies the position. The touch sensor 22 generates input data including detection information indicative of the detected touch or approach, and the position thereof, and outputs the generated input data to the control unit 10. The touch sensor 22 may detect, as a contact pressure, a pressure at a touch position in contact with the input device 30, include information of the detected contact pressure in input data, and output the input data to the control unit 10. The touch sensor 22 may also detect, as a pen angle, an angle of the longitudinal direction of the input device 30 with respect to the display screen DF. The touch sensor 22 may include information of the detected pen angle in input data and output the input data to the control unit 10. The approach to the display screen DF and the detection of the pen angle will be described later.

The control unit 10 controls the overall functionality of the information processing apparatus 1. The control unit 10 includes a display processing unit 102, a sound setting unit 103, a sound processing unit 104, and a vibration control unit 110.

For example, the sound setting unit 103 displays a sound setting screen (not illustrated) as the display screen DF (FIG. 1) of the display unit 21. The sound setting screen is a screen for setting a presentation device to present sound, and the volume of the presentation device. The sound setting screen is connected to the own unit to display presentable devices that allow sounds to be presented, on which screen components to give an instruction of a volume adjustment amount for each presentable device are disposed. The volume adjustment amount corresponds to a gain for a sound signal.

The sound setting unit 103 may also set a sound presentation mode indicative of the necessity of sound output for each presentable device. As sound presentation modes, for example, there are a normal mode, a silent mode, and the like. The normal mode is an operating mode to make sound presentable based on the acquired sound signal. The silent mode is an operating mode not to present sound based on the acquired sound signal. The silent mode is also called a vibrate mode. The sound presentation mode may be set commonly for the presentable devices of the information processing apparatus 1.

For example, the sound setting unit 103 selects any one of the presentable devices as a presentation device based on the input data from the touch sensor 22, and sets a volume adjustment amount for the presentation device. As the presentable devices, for example, a speaker 26 (to be described later) and the input device 30 are included. The sound setting unit 103 outputs, to the sound processing unit 104, sound setting information indicative of the selected presentation device and the volume adjustment amount. The sound setting information may also include information of the sound presentation mode.

The sound setting unit 103 may apply the silent mode common to the presentable devices of the information processing apparatus 1 with a higher priority than the sound presentation mode for each presentable device. In other words, when the silent mode is set as the sound presentation mode common to the presentable devices, the silent mode is notified as sound setting information for the input device 30 as the presentation device.

The sound setting unit 103 may also make the volume adjustment amount for the input device 30 settable regardless of whether or not the input device 30 is selected as the presentation device. It is acceptable that the input device 30 can generate a contact sound in response to contact with the touch sensor 22 regardless of whether or not the input device 30 is selected as the presentable device. When the volume adjustment amount for the input device 30 is set, the sound setting unit 103 outputs, to the input device 30, sound setting information indicative of the volume adjustment amount for the input device 30 as acoustic environment information via the wireless communication unit 29. The sound setting information can also be regarded as information for conveying the acoustic environment of the information processing apparatus 1.

For example, the functionality of the sound setting unit 103 can be implemented by executing a device setting API (Application Programming Interface) function of an operating system (OS). The functionality of the sound setting unit 103 may be implemented by calling the API function according to an application program (which may also be called an "app" in the present application). Further, in the present application, the execution of a program also includes the meaning of the execution of processing instructed by various commands written in the program.

When sound presentation is instructed, the sound processing unit 104 acquires a sound signal. For example, the sound presentation can be instructed by input data indicative of pressing of an audio play button from the touch sensor 22. The sound processing unit 104 may acquire the sound signal using any one of the following techniques, namely: input of a sound signal from the outside of the information processing apparatus 1; reading of a prestored sound signal; sound signal synthesis; and the like. The sound processing unit 104 may also be implemented as part of the functionality of the app pertaining to the sound setting unit 103. For example, the app concerned may be any one of a voice call app, a record/playback app, a sound synthesis app, a sound streaming app, and the like.

The sound setting information is input from the sound setting unit 103 to the sound processing unit 104. The sound processing unit 104 adjusts the volume of the sound signal acquired by the volume adjustment amount instructed by the sound setting information. The sound processing unit 104 outputs a sound signal after the volume is adjusted to the presentation device instructed by the acoustic environment information. Note that when the silent mode (vibrate mode) is instructed in the sound setting information, the sound processing unit 104 stops output of the acquired sound signal until the release of the silent mode is instructed next.

Note that the sound setting unit 103 may also determine, as an ambient volume, the volume of a sound signal input from a microphone 25. The sound setting unit 103 may include information indicative of the determined ambient volume in the acoustic environment information, and output the acoustic environment information to the input device 30 via the wireless communication unit 29.

Further, when the speaker 26 is selected as the presentation device in the sound setting unit 103, the sound processing unit 104 may output, to the sound setting unit 103, the sound signal after the volume is adjusted. The sound setting unit 103 determines, as a speaker volume, the volume of the sound signal after the volume is adjusted and input from the sound processing unit 104. The sound setting unit 103 may include information indicative of the determined speaker volume in the acoustic environment information and output the acoustic environment information to the input device 30 via the wireless communication unit 29.

The display processing unit 102 performs data input or editing according to input operation instructed by input data from the touch sensor 22. For example, the display processing unit 102 identifies respective contact positions instructed by input data input at regular intervals and forms a time series of contact positions. The display processing unit 102 generates and displays, on the display unit 21, a movement trajectory based on the formed time series of contact positions.

The vibration control unit 110 provides, to the input device 30, information used for vibration control by the vibrating unit 55 based on the input data indicative of input operation from the touch sensor 22. The functionality of the vibration control unit 110 may be, for example, implemented by executing a device driver of the input device 30.

The vibration control unit 110 detects, from the input data indicative of contact with the touch sensor 22, either or both of contact position information and contact pressure information as vibration control information. The vibration control unit 110 outputs the detected vibration control information to the input device 30 via the wireless communication unit 29. The vibration control unit 110 may estimate, from the input data, an angle between a moving direction of the contact positions of the input device 30 on the display screen DF and the longitudinal direction of the input device 30 as an azimuth angle. For example, the vibration control unit 110 can determine, as the moving direction of the input device 30, a direction of displacement from the contact position at the previous time to the contact position at the time. The vibration control unit 110 can determine the pen angle indicated in the input data to be a longitudinal orientation of the input device 30 at the time. The vibration control unit 110 may include information indicative of the estimated azimuth angle in the vibration control information and output the vibration control information to the input device 30.

The wireless communication unit 29 uses a predetermined communication system to transmit and receive various data wirelessly to and from the input device 30.

Next, a schematic configuration example of the input device 30 will be described. The input device 30 includes a wireless communication unit 31, a device control unit 50, and the vibrating unit 55.

The wireless communication unit 31 uses a predetermined communication system to transmit and receive various data wirelessly to and from the information processing apparatus 1.

The device control unit 50 centrally controls the functionality of the input device 30. For example, the acoustic environment information and the vibration control information are input from the information processing apparatus 1 to the device control unit 50 using the wireless communication unit 31. The device control unit 50 uses the acoustic environment information and the vibration control information to synthesize drive signals to vibrate the vibrating unit 55 (drive signal synthesis). The device control unit 50 outputs the synthesized drive signal to the vibrating unit 55.

The device control unit 50 refers to preset reference vibration waveform information to generate a vibration signal indicative of a vibration component based on the reference vibration waveform information. The reference vibration waveform information is information indicative of a reference vibration waveform. The characteristics of the vibration component are adjusted by the device control unit 50 using the reference vibration waveform information. The device control unit 50 refers to preset reference sound waveform information to generate a sound signal indicative of a sound component based on the sound setting information. The output characteristics of the sound component are adjusted by the device control unit 50 using the acoustic environment information. A generation example of a drive signal will be described later.

The vibrating unit 55 vibrates according to the drive signal input from the device control unit 50. The sound component in the vibration of the vibrating unit 55 generates sound waves presented as sounds. The vibration component in the vibration of the vibrating unit 55 is presented as vibration.

In general, a human audible range is about 20 Hz to 20 kHz, and the sensitivity in a band of 500 Hz to 2 kHz is higher than the sensitivity in the other frequency bands. The sensitivity decreases in a lower frequency band. In contrast, in terms of the sense of human touch, the sensitivity in a band of 10 to 100 Hz is higher than the sensitivity in the other frequency bands. The sensitivity decreases in a higher frequency band. Vibration at frequencies of 500 Hz or more is barely perceived. The vibration signal is mainly composed of low-frequency components of about 200 Hz or less. In contrast, the sound signal is mainly composed of high-frequency components of about 200 Hz or more.

Figure 3:
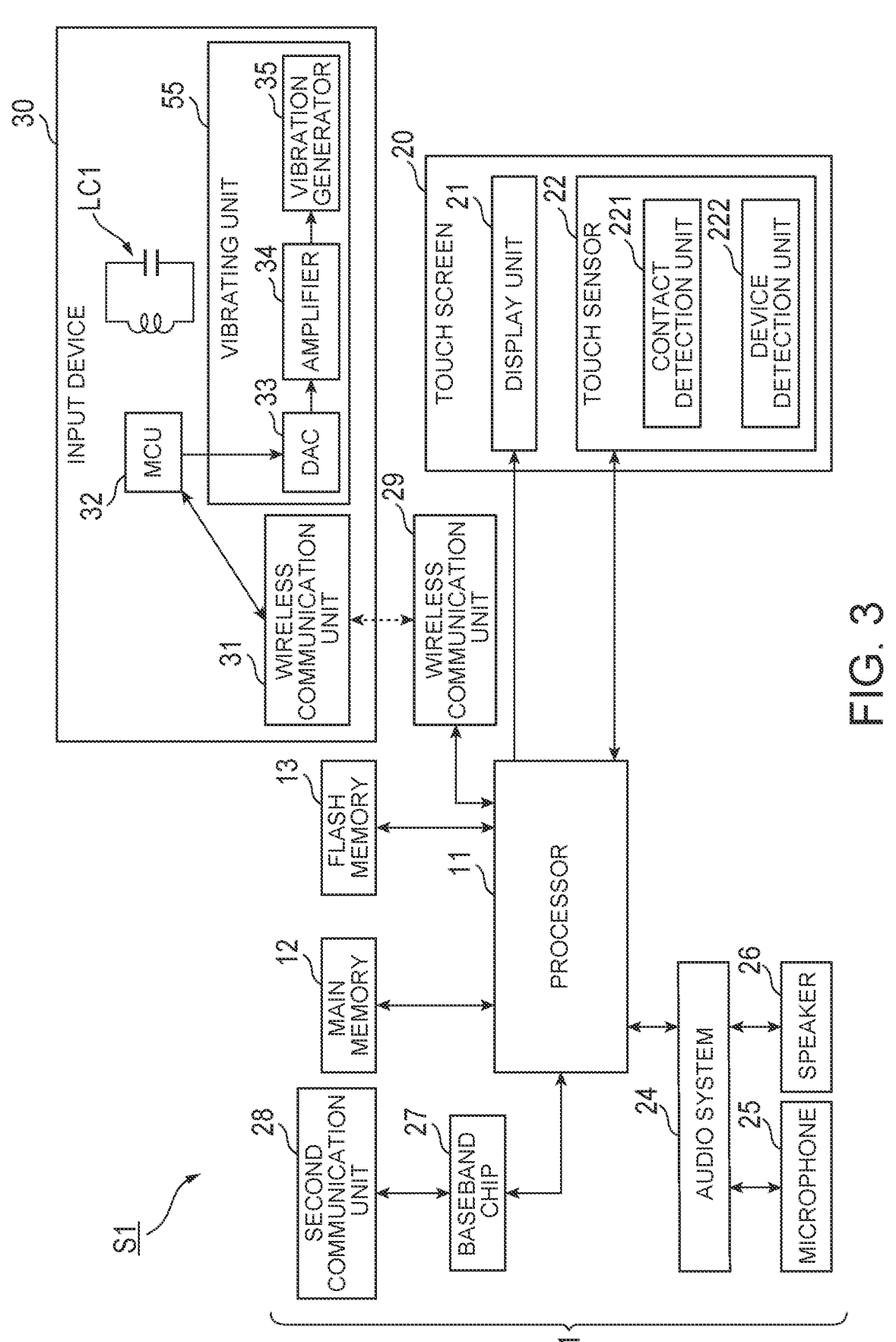
FIG. 3 is a block diagram illustrating a hardware configuration example of the information processing system according to the present embodiment.

Next, a hardware configuration example of the information processing system S1 according to the present embodiment will be described. FIG. 3 is a block diagram illustrating the hardware configuration example of the information processing system S1 according to the present embodiment. The information processing system S1 includes the information processing apparatus 1 and the input device 30. The information processing apparatus 1 includes a processor 11, a main memory 12, a flash memory 13, the touch screen 20, an audio system 24, the microphone 25, the speaker 26, a baseband chip 27, a second communication unit 28, and the wireless communication unit 29.

The processor 11 controls the overall functionality of the information processing apparatus 1. As the processor 11, for example, one or more CPUs (Central Processing Units) are applied. The processor 11 executes a predetermined program to function as the control unit 10 in collaboration with the main memory 12 and other hardware.

The main memory 12 is a writable memory used as a working area of the processor 11, that is, used as a reading area of execution programs and various setting data, and a writing area of processed data acquired by executing the programs. The main memory 12 is composed, for example, of plural DRAM (Dynamic Random Access Memory) chips. The execution programs include the OS, various drivers for controlling peripheral devices, and the like, various services/utilities, apps, and the like.

In the flash memory 13, the OS, various drivers, various services/utilities, apps, and various data are prestored.

The display unit 21 displays various display screens based on display data output from the processor 11. The display unit 21 may be, for example, either a liquid crystal display, an organic electro-luminance display, or the like.

The touch sensor 22 includes a contact detection unit 221 and a device detection unit 222.

The contact detection unit 221 detects an object (mainly the input device 30 in the present application) in contact with the display screen DF and the contact position thereof. The contact detection unit 221 detects the contact pressure of the object in contact with the display screen DF. The contact detection unit 221 is, for example, a capacitive pressure sensor. The contact detection unit 221 may also detect a tilt of the object in contact with the touch sensor 22, that is, a pen angle. When the contact detection unit 221 is a three-axis pressure sensor, the pen angle can be identified by using directional cosines for the pressure in respective axial directions.

The device detection unit 222 detects the input device 30 that has approached though not in contact with the own unit, and the position thereof as an approach position. The device detection unit 222 includes, for example, an electromagnetic induction sensor. The electromagnetic induction sensor detects an AC-induced magnetic field generated in a resonant circuit LC1 (to be described later) by the approach of the input device 30. The electromagnetic induction sensor can detect the presence or absence of the approach of the input device 30 based on whether or not such a position that the magnitude of the magnetic field detected at the resonance frequency exceeds a certain value exists. The electromagnetic induction sensor can identify, as the approach position of the input device 30, the position at which the detected magnitude of the magnetic field exceeds the certain value.

The audio system 24 performs processing on the sound signal, that is, processing to input, output, record, play back, encode, decode the sound signal, and the like. For example, the audio system 24 includes an audio IC (Integrated Circuit). To the audio system 24, the microphone 25 and the speaker 26 are connected. To the audio system 24, the sound signal can be input from the processor 11, the microphone 25, or the baseband chip 27. The audio system 24 reads the sound signal recorded in the own unit. The audio system 24 can output the acquired sound signal to the speaker 26 or the processor 11. The sound signal output to the processor 11 can be output to the second communication unit 28 via the baseband chip 27, or to the input device 30 via the wireless communication unit 29.

The microphone 25 collects sounds coming to the own unit, and outputs a sound signal of the collected sounds to the audio system 24.

The speaker 26 presents sounds based on the sound signal input from the audio system 24.

The baseband chip 27 is a dedicated IC for controlling communication using the second communication unit 28. For example, the baseband chip 27 realizes communication using a public wireless communication system, such as 4G (the 4th generation wireless communication system) or 5G (the 5th generation wireless communication system), a local-area wireless communication network defined in IEEE 802.11, or the like. The baseband chip 27 connects to other devices via a communication network using the second communication unit 28 under the control of the processor 11 in a manner capable of transmitting and receiving various data to and from the other devices to transmit and receive the various data.

The second communication unit 28 is a wireless communication module to connect to the wireless communication network. The second communication unit 28 is equipped with an antenna to transmit and receive radio waves.

The wireless communication unit 29 is a wireless communication module for transmitting and receiving wireless data to and from the input device 30. The wireless communication unit 29 can use, as the communication system, a wireless PAN (Personal Area Network) system, for example, defined in IEEE 802.15.1.

The input device 30 is an operating medium having an elongated shape with the length greater than the diameter. The input device 30 includes the wireless communication unit 31, an MCU 32, the vibrating unit 55, and the resonant circuit LC1.

The wireless communication unit 31 is a wireless communication module for transmitting and receiving wireless data to and from the wireless communication unit 29 of the information processing apparatus 1.

The MCU (Micro Controller Unit) 32 centrally controls the functionality of the input device 30. The MCU 32 includes a processor, memories such as a ROM and a RAM, and various input/output interfaces. The MCU 32 operates independently of the information processing apparatus 1. The MCU 32 executes a predetermined program to function as the device control unit 50 mentioned above.

The sound setting information and the vibration control information are input from the information processing apparatus 1 to the MCU 32 using the wireless communication unit 31. The MCU 32 uses one or both of the sound setting information and the vibration control information to synthesize a drive signal. The MCU 32 outputs the synthesized drive signal to the vibrating unit 55.

The vibrating unit 55 includes a DAC 33, an amplifier 34, a vibration generator 35.

The DAC (Digital-to-Analog Converter) 33 converts a digital drive signal input from the MCU 32 into an analog drive signal. The DAC 33 outputs the converted analog drive signal to the amplifier 34.

The amplifier 34 adjusts the amplitude of the drive signal input from the DAC 33, and outputs, to the vibration generator 35, a drive signal with the amplitude adjusted.

The vibration generator 35 is an actuator that generates vibration according to the drive signal input from the amplifier 34. The vibration generator 35 includes, for example, a piezoelectric vibrator such as a piezo element.

The resonant circuit LC1 is an electric circuit to produce a current that resonates at a constant resonance frequency. The resonant circuit LC1 is constructed, for example, by connecting a coil and a capacitor in series. The resonant circuit LC1 generates a magnetic field with varying polarity at the resonance frequency by an alternating current generated by itself. The generated magnetic field causes the device detection unit 222 of the touch sensor 22 to detect the approach of the input device 30.

Next, a functional configuration example of the information processing system S1 according to the present embodiment will be described.

Figure 4:
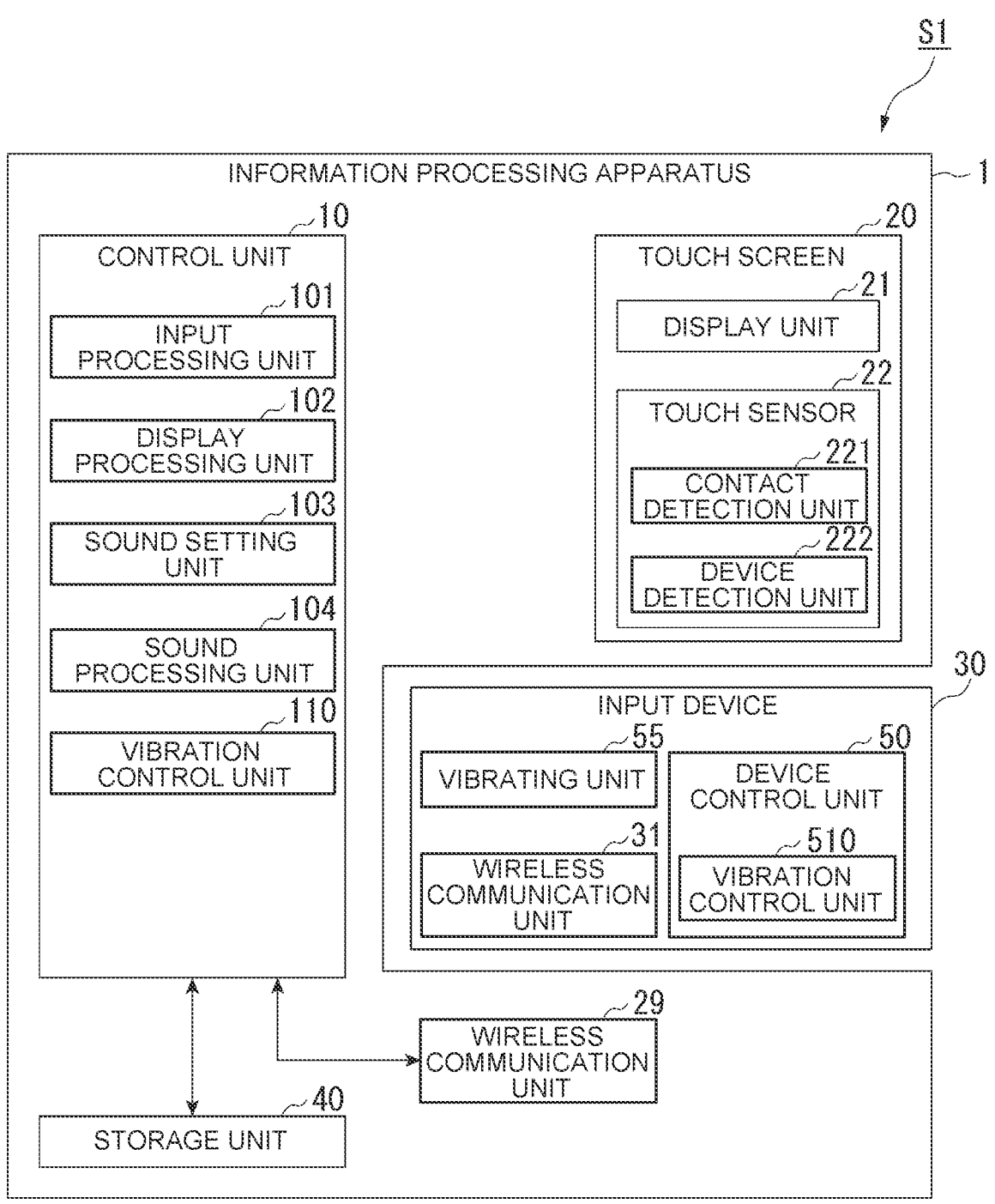
FIG. 4 is a block diagram illustrating an example of the functional configuration of the information processing system according to the present embodiment.

FIG. 4 is a block diagram illustrating the functional configuration example of the information processing system S1 according to the present embodiment. In the example of FIG. 4, differences from FIG. 2 and FIG. 3 will be mainly described. Points common to those in FIG. 2 and FIG. 3 are given common reference numerals and the above description is invoked unless otherwise stated.

The information processing system S1 includes the information processing apparatus 1 and the input device 30.

The information processing apparatus 1 includes the control unit 10, the touch screen 20, the wireless communication unit 29, and a storage unit 40. The storage unit 40 is, for example, realized by the main memory 12 and the flash memory 13.

The control unit 10 includes an input processing unit 101, the display processing unit 102, the sound setting unit 103, the sound processing unit 104, and the vibration control unit 110.

The input device 30 includes the wireless communication unit 31, the device control unit 50, and the vibrating unit 55.

The input processing unit 101 controls input from the touch sensor 22. For example, the function of the input processing unit 101 is implemented by the execution of a device driver for the touch sensor 22 by the processor 11. The input processing unit 101 outputs, to the vibration control unit 110, input data input from the touch sensor 22 according to OS commands.

The input device 30 includes a vibration control unit 510 in the device control unit 50.

The vibration control unit 510 controls the vibration of the vibrating unit 55 based on the acoustic environment information and the vibration control information input using the wireless communication unit 31 as mentioned above. When the touch on the touch sensor 22 is notified by the vibration control information, the vibration control unit 510 generates a drive signal including the sound component and the vibration component. The vibration control unit 510 outputs the generated drive signal to the vibrating unit 55.

The vibration control unit 510 controls the output characteristics of the entire drive signal based on a contact state with the touch sensor 22 transmitted in the vibration control information. For example, when contact position information is included as the contact state, the vibration control unit 510 increases the amplitude of the vibration component or the entire drive signal as the moving speed of the contact position is higher. When contact pressure information is included as the contact state, the vibration control unit 510 may increase the amplitude of the vibration component or the entire drive signal as the contact pressure is higher. When information of the volume adjustment amount (pen volume) for the input device 30 is included in the acoustic environment information, the vibration control unit 510 may adjust the volume of the sound component based on the volume adjustment amount. Further, when information indicative of the silent mode is included as the sound presentation mode in the acoustic environment information, the vibration control unit 510 stops the output of the sound component. When stopping the output of the sound component, the vibration control unit 510 includes the vibration component in the drive signal without including the sound component before outputting the drive signal.

When information indicative of the speaker volume is included in the acoustic environment information, the vibration control unit 510 may control the output characteristics of the sound component based on the speaker volume. For example, when the speaker volume is larger than a predetermined reference volume to the speaker volume, the vibration control unit 510 stops the output of the sound component.

When information indicative of the ambient volume is included in the acoustic environment information, the vibration control unit 510 may control the output characteristics of the sound component based on the ambient volume. For example, when the ambient volume is larger than a predetermined reference volume to the ambient volume, the vibration control unit 510 stops the output of the sound component.

Figures 5, 6, 7, 8:
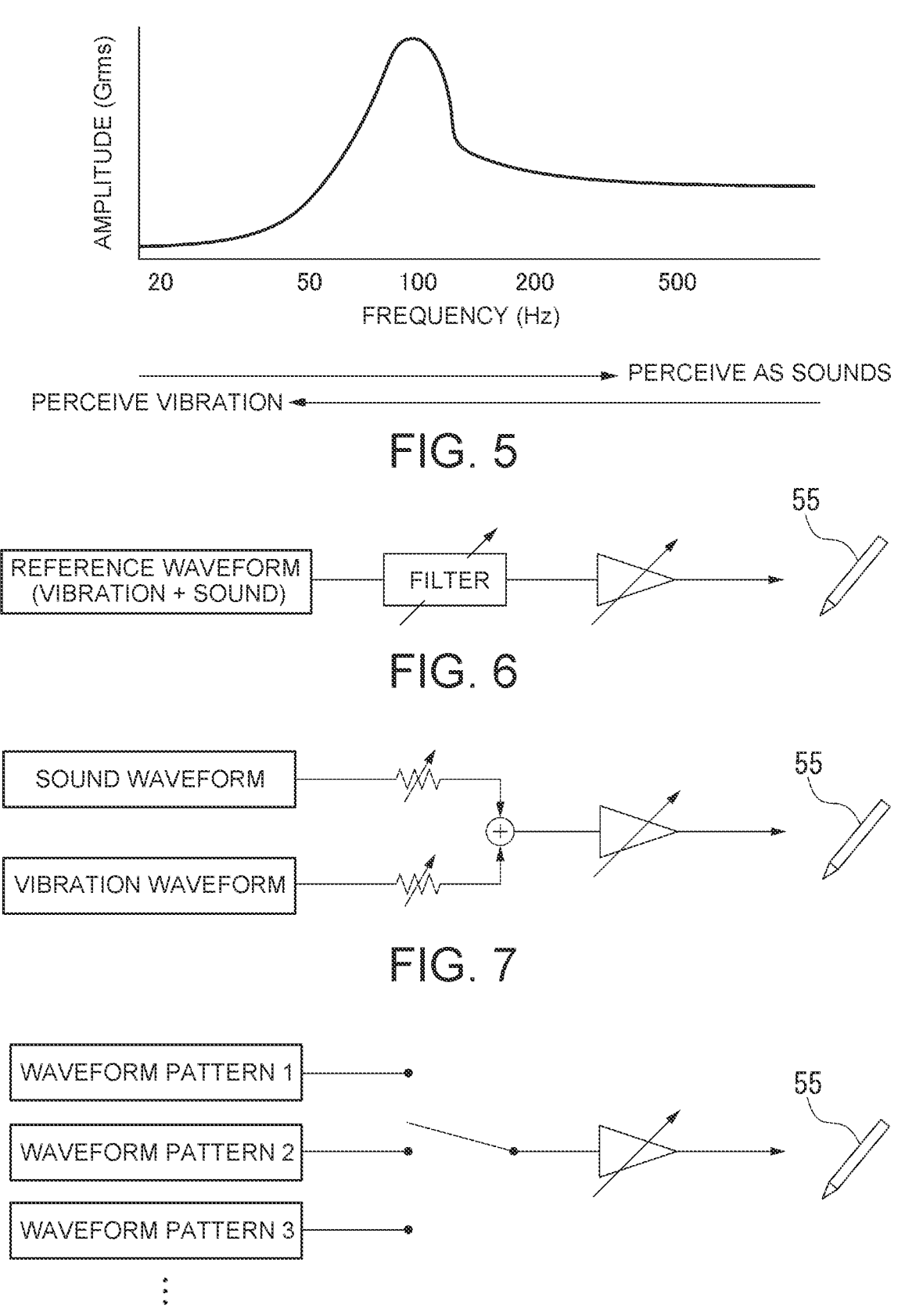
FIG. 5 is a graph illustrating an example of the output characteristics of a vibration generator according to the present embodiment.
FIG. 6 is a diagram illustrating a first example of a control method of a sound component according to the present embodiment.
FIG. 7 is a diagram illustrating a second example of the control method of the sound component according to the present embodiment.
FIG. 8 is a diagram illustrating a third example of the control method of the sound component according to the present embodiment.

Next, an example of the output characteristics of the vibration generator 35 according to the present embodiment is illustrated. FIG. 5 is a graph illustrating an example of the output characteristics of the vibration generator 35 according to the present embodiment. The horizontal axis and the vertical axis in FIG. 5 denote frequency (Hz) and amplitude (Grms: effective acceleration), respectively. As the amplitude, the amplitude of effective acceleration that occurs in the vibration generator 35 with respect to constant driving power per frequency is plotted. It is illustrated that the larger the amplitude value, the more the vibrating unit 55 vibrates efficiently. The amplitude becomes maximum roughly at 100 Hz. In such a low range that the frequency is lower than 100 Hz, the amplitude becomes smaller as the frequency is lower, while in such a high range that the frequency is higher, the amplitude becomes smaller as the frequency is higher. However, the amplitude drop in the high range is slower than that in the low range. This indicates that sound presentation is possible in the high range in which the amplitude is mainly perceived as sounds and not perceived as vibration. Thus, the vibration control unit 510 can control the output characteristics of the sound component by adjusting the amplitude of the output characteristics mainly in the high range.

Next, examples of control methods of the sound component will be described. FIG. 6 is a diagram illustrating a first example of a control method of the sound component according to the present embodiment.

In the first example, a reference waveform signal and a control table (not illustrated) are preset in the vibration control unit 510. The reference waveform signal is a time-series signal including the vibration component and the sound component. The vibration control unit 510 includes a variable filter and a variable amplifier. In the control table, information indicative of a correspondence between a filter coefficient of the variable filter and the output characteristics of the sound component, and information indicative of a correspondence between a set of the moving speed and the contact pressure, and the gain.

When generating a drive signal, the vibration control unit 510 reads a set reference waveform signal to supply the reference waveform signal to the variable filter. The vibration control unit 510 refers to the control table to determine a filter coefficient corresponding to the output characteristics notified in the acoustic environment information, and sets the determined filter coefficient in the variable filter. A sound adjustment signal indicative of a waveform in which the sound component is adjusted to have the set output characteristics is output from the variable filter to the variable amplifier.

Based on the contact state notified in the vibration control information, the vibration control unit 510 identifies the moving speed and the contact pressure of the contact position. The vibration control unit 510 refers to the control table to determine a gain corresponding to a set of the identified moving speed and contact pressure, and to set the determined gain in the variable amplifier. A drive signal with the amplitude adjusted by the set gain is output from the variable filter to the vibrating unit 55.

Next, another example of the control method of the sound component will be described. FIG. 7 is a diagram illustrating a second example of the control method of the sound component according to the present embodiment.

In the second example, a control table (not illustrated) is set in the vibration control unit 510, and a sound signal indicative of a sound waveform and a vibration signal indicative of a vibration waveform are acquired.

Instead of the variable filter for the reference waveform, the vibration control unit 510 includes a variable resistance element for the sound component (hereinafter called the "variable resistance element for sound") and a variable resistance element for the vibration component (hereinafter called the "variable resistance element for vibration"), respectively for the sound waveform and the vibration waveform, and an adder. In the control table, information indicative of a correspondence between a resistance value of the variable resistance element for sound and the output characteristics of the sound component, information indicative of a correspondence between a resistance value of the variable resistance element for vibration and the output characteristics of the sound component, and information indicative of a correspondence between the set of the moving speed and the contact pressure, and the gain are included. Although the information indicative of the correspondence between the resistance value of the variable resistance element for vibration and the output characteristics of the sound component is not necessarily required, the information may be set for the purpose of adjusting the relative ratio of the sound component in the drive signal.

The vibration control unit 510 refers to the control table to identify resistance values respectively for the variable resistance element for sound and the variable resistance element for vibration corresponding to the output characteristics notified in the acoustic environment information, and sets the respectively identified resistance values in the variable resistance element for sound and the variable resistance element for vibration. The vibration control unit 510 outputs the acquired sound signal and vibration signal to the variable resistance element for sound and the variable resistance element for vibration, respectively. The vibration control unit 510 outputs a sound signal and an amplitude signal, in which respective amplitudes are adjusted, from the variable resistance element for sound and the variable resistance element for vibration to the adder.

The adder adds the input sound signal and amplitude signal to generate a drive signal, and outputs the generated drive signal to the variable amplifier.

Like in the first example, the vibration control unit 510 refers to the control table to set a gain in the variable amplifier and adjust the gain of the drive signal using the variable amplifier.

In the second example, an attenuator or an amplifier for the sound component and an attenuator or an amplifier for the vibration component may be used instead of the variable resistance element for sound and the variable resistance element for vibration.

In the second example, a reference sound waveform signal and a reference vibration waveform signal preset in the vibration control unit 510 may also be used as a sound signal and a vibration signal to be processed. The reference sound waveform is not necessarily limited to the sound waveform of a fricative sound produced by the friction between a writing instrument and paper upon writing, and a warning sound or any other notification sound may also be used. Further, in this configuration, the output characteristics of the sound signal and the vibration signal can be controlled independently of each other. Therefore, the vibration control unit 510 may use the sound signal input from the information processing apparatus 1 as a sound signal to be processed, or may use a sound signal synthesized on its own as the sound signal to be processed. As the output destination of the sound signal input or synthesized, the input device 30 can be specified as the presentation device by the sound setting unit 103.

The vibration control unit 510 may synthesize the vibration signal on its own. For example, when the vibration control information has azimuth angle information, the vibration control unit 510 may synthesize a vibration signal corresponding to the azimuth angle as the vibration signal to be processed. In this case, reference waveform information and a synthesis table are prestored in the vibration control unit 510. The reference waveform information is information indicative of reference waveforms respectively for predetermined plural reference azimuth angles. Three or more reference azimuth angles just have to be set in an angle range of 0° to 180°. The synthesis table is a data table indicative of a synthesis ratio of each azimuth angle with respect to the reference waveform for each reference azimuth angle. The vibration control unit 510 refers to the synthesis table to determine the synthesis ratio of the notified azimuth angle for each reference azimuth angle. The vibration control unit 510 can generate, as a vibration signal, a weighted sum of vibration waveforms between reference azimuth angles using the determined synthesis ratio as a weighting factor.

Next, still another example of the control method of the sound component will be described. FIG. 8 is a diagram illustrating a third example of the control method of the sound component according to the present embodiment.

In the third example, a control table (not illustrated) is set in the vibration control unit 510, and waveform patterns of plural drive signals are preset. Each waveform pattern includes at least the vibration component, and the respective waveform patterns are different in the output characteristics of the sound component. In the control table, information indicative of a correspondence between the set of the moving speed and the contact pressure, and the gain is included. In the control table, information about the output characteristics of the sound signal may not be included.

Among the plural waveform patterns, the vibration control unit 510 reads a waveform pattern corresponding to the output characteristics notified in the acoustic environment information, and outputs a drive signal pertaining to the read waveform pattern to the variable amplifier. Like in the first example, the vibration control unit 510 refers to the control table to set a gain in the variable amplifier and adjust the gain of the drive signal using the variable amplifier.

Note that, in the vibration control unit 510, the reference waveform signal, the reference sound waveform signal, the reference vibration waveform signal, and the drive signal (waveform pattern) mentioned above are stored in data files having a predetermined file format(s) (for example, WAVE format), respectively.

Figure 9:
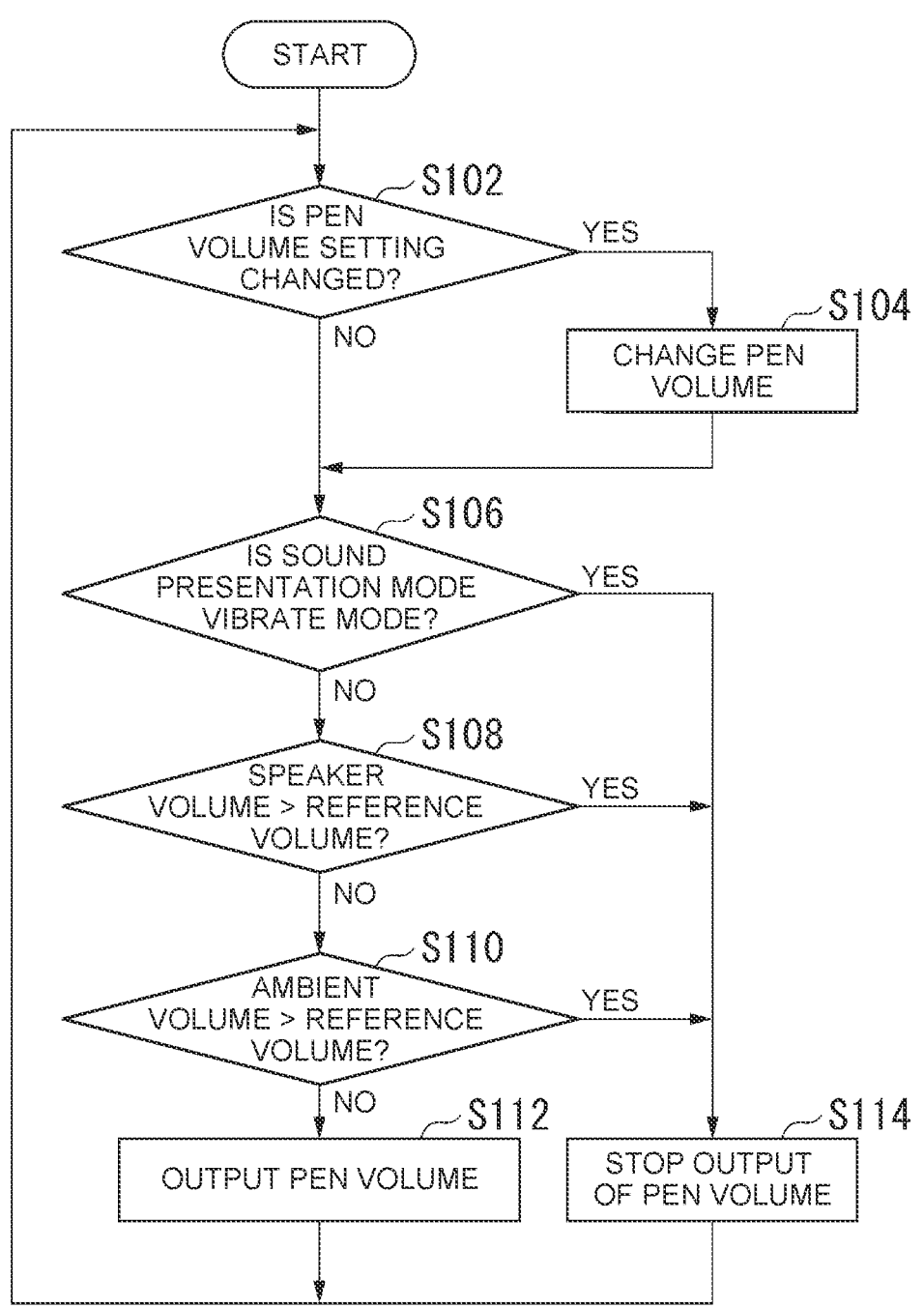
FIG. 9 is a flowchart illustrating an example of a sound output control method according to the present embodiment.

Next, an example of a sound output control method according to the present embodiment will be described. FIG. 9 is a flowchart illustrating an example of the sound output control method according to the present embodiment.

(Step S102) The vibration control unit 510 of the input device 30 waits for acoustic environment information to be input from the information processing apparatus 1. The vibration control unit 510 determines whether or not the pen volume setting is changed based on whether or not information of the volume adjustment amount is included in the acoustic environment information. When determining that the setting is changed (YES in step S102), the vibration control unit 510 proceeds to a process in step S104. When determining that the setting is not changed (NO in step S102), the vibration control unit 510 proceeds to a process in step S106.

(Step S104) The vibration control unit 510 adjusts the volume of the sound component based on the volume adjustment amount notified in the acoustic environment information (change in pen volume).

(Step S106) The vibration control unit 510 determines whether or not the silent mode is set as the sound presentation mode based on whether or not information indicative of the silent mode (vibrate mode) is included in the acoustic environment information. When determining that the silent mode is set (YES in step S106), the vibration control unit 510 proceeds to a process in step S114. When determining that the silent mode is not set (NO in step S106), the vibration control unit 510 proceeds to a process in step S108.

(Step S108) When information indicative of the speaker volume is included in the acoustic environment information, the vibration control unit 510 determines whether or not the speaker volume is larger than a predetermined reference volume. When determining that the speaker volume is larger (YES in step S108), the vibration control unit 510 proceeds to the process in step S114. When determining that the speaker volume is not larger (NO in step S108), the vibration control unit 510 proceeds to a process in step S110.

(Step S110) When information indicative of the ambient volume is included in the acoustic environment information, the vibration control unit 510 determines whether or not the ambient volume is larger than a predetermined reference volume. When determining that the ambient volume is larger (YES in step S110), the vibration control unit 510 proceeds to the process in step S114. When determining that the ambient volume is not larger (NO in step S110), the vibration control unit 510 proceeds to a process in step S112.

(Step S112) The vibration control unit 510 outputs a drive signal including the sound component to the vibrating unit 55. The vibrating unit 55 presents sounds based on the sound component included in the drive signal (pen sound output). After that, the procedure returns to the process in step S102.

(Step S114) The vibration control unit 510 outputs, to the vibrating unit 55, a drive signal including the vibration component but not including the sound component. The vibrating unit 55 vibrates according to the drive signal, and the sound presentation is stopped (stop of pen sound output). After that, the procedure returns to the process in step S102.

In the example mentioned above, as illustrated in FIG. 4, the input device 30 includes the vibration control unit 510 to generate the drive signal based on the acoustic environment information and the vibration control information input from the information processing apparatus 1, but the present invention is not limited to this example.

Figure 10:
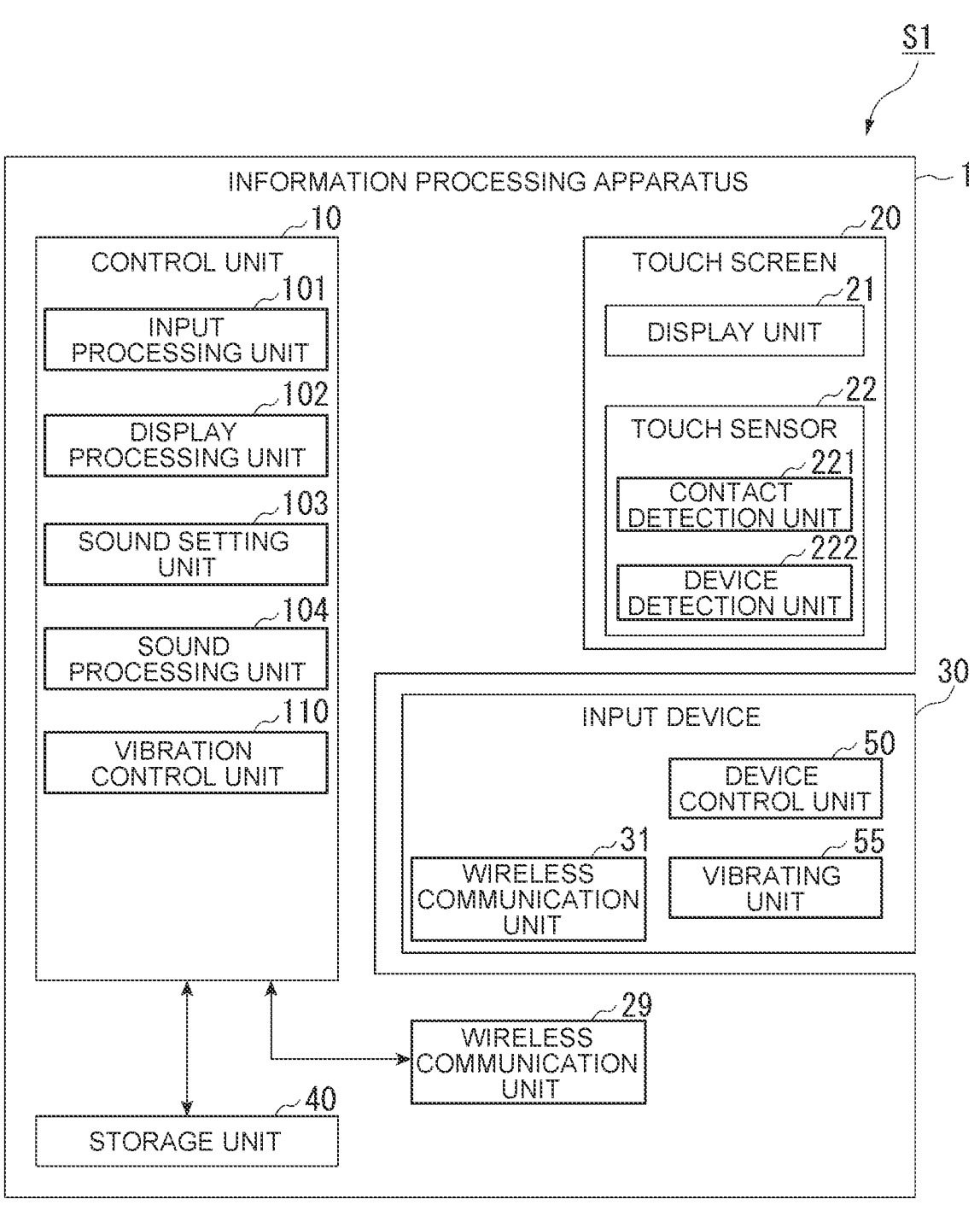
FIG. 10 is a block diagram illustrating another example of the functional configuration of the information processing system according to the present embodiment.

The vibration control unit 110 of the information processing apparatus 1 as illustrated in FIG. 10 may also generate a drive signal based on the acoustic environment information and the vibration signal information by a method similar to that for the vibration control unit 510 mentioned above without outputting the acoustic environment information and the vibration control information to the input device 30. In the vibration control unit 110, parameters and other data used in the processing are preset. The vibration control unit 110 outputs the generated drive signal to the input device 30 using the wireless communication unit 29. In the input device 30, the device control unit 50 outputs, to the vibrating unit 55, the drive signal input from the information processing apparatus 1 using the wireless communication unit 31. In this example, the vibration control unit 510 may be omitted from the input device 30.

Further, in the example mentioned above, the case where the information processing apparatus 1 is a tablet terminal is mainly described, but the present invention is not limited to this case. The information processing apparatus 1 may also be any other form of information communication equipment to perform information input using the touch screen such as a multi-functional mobile phone (including a so-called smartphone), a personal computer, and the like.

As described above, the information processing system S1 according to the present embodiment includes the information processing apparatus 1 and the input device 30. The input device 30 includes the vibrating unit 55. The information processing apparatus 1 includes the touch sensor 22 and the display unit 21 where the touch sensor 22 and the display unit 21 are superimposed on each other. A controller of the information processing apparatus 1 or the input device 30 (for example, either one or both of the processor 11 and the MCU 32) supplies, to the vibrating unit, a drive signal obtained by synthesizing the vibration component and the sound component in response to contact of the input device 30 with the touch sensor 22, and determines the output characteristics of the sound component based on the acoustic environment of the information processing apparatus 1.

With this configuration, the output characteristics of the sound component are determined based on the acoustic environment of the information processing apparatus 1 to vibrate the vibrating unit according to the vibration component of the drive signal and present sounds according to the sound component in response to contact with the input device 30. The output characteristics of sounds to be presented are determined based on the acoustic environment. Therefore, the feeling of use of the input device 30 vibrating in response to contact with the touch sensor 22 is improved.

The controller may determine the intensity (for example, the amplitude) of the sound component according to the volume setting for the input device 30 (for example, according to the volume adjustment amount).

With this configuration, the controller can cause the input device 30 to present sounds at a desired intensity according to the volume setting for the input device 30.

When the silent mode (that is, vibrate mode) is set, the controller may stop the output of the sound component.

With this configuration, the presentation of sounds from the input device 30 is stopped when the silent mode is set.

The information processing apparatus 1 includes the speaker 26, and when the sound volume from the speaker 26 exceeds the predetermined reference volume, the controller may stop the output of the sound component.

With this configuration, the presentation of the sound of the input device 30 with the volume of the speaker 26 larger than the reference volume is stopped. When any other sound cannot hear or is difficult to hear due to the sounds from the speaker 26, the presentation of the sound from the input device 30 is avoided.

The information processing apparatus 1 includes the sound collecting unit (for example, the microphone 25) for collecting ambient sounds, and the controller may determine the intensity of the sound component based on the intensity of sounds collected by the sound collecting unit (for example, the output of the sound component is stopped when the sound volume from the speaker 26 exceeds the reference volume).

With this configuration, sounds are presented from the input device 30 with the intensity determined based on the intensity of the ambient sounds collected by the sound collecting unit. Therefore, the user can hear the sounds presented from the input device 30 at the volume corresponding to the volume of the environmental sound without any special operation.

While the embodiment of this invention has been described in detail above with reference to the accompanying drawings, the specific configurations are not limited to those in the above-described embodiment, and design changes are included without departing from the scope of this invention. The respective configurations in the embodiment described above can be combined arbitrarily.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

S1 information processing system
1 information processing apparatus
10 control unit
11 processor
12 main memory
13 flash memory
20 touch screen
21 display unit
22 touch sensor
24 audio system
25 microphone
26 speaker
27 baseband chip
28 second communication unit
29 wireless communication unit
30 input device
31 wireless communication unit
32 MCU
33 DAC
34 amplifier
35 vibration generator
40 storage unit
50 device control unit
55 vibrating unit
101 input processing unit
102 display processing unit
103 sound setting unit
104 sound processing unit
110 vibration control unit
221 contact detection unit
222 device detection unit
510 vibration control unit

What is claimed is:

1. An information processing system comprising:
an information processing apparatus and a digital pen, where the digital pen includes a vibrator, the information processing apparatus includes a touch sensor and a display, and the touch sensor and the display are superimposed on each other, wherein
the vibrator includes a conversion circuit and an actuator, a controller of the information processing apparatus or the digital pen supplies, to the vibrator, a drive signal obtained by synthesizing a vibration component and a sound component in response to contact of the digital pen with the touch sensor, the drive signal is supplied to the actuator through the conversion circuit, the controller determines output characteristics of the sound component based on an acoustic environment of the information processing apparatus, and the actuator vibrates to independently produce each of the sound component and the vibration component, the information processing apparatus further includes a speaker, and when a sound volume from the speaker exceeds a predetermined reference volume greater than zero, the controller stops output of the sound component.

2. The information processing system according to claim 1, wherein the controller determines intensity of the sound component according to a sound volume setting for the digital pen.

3. The information processing system according to claim 1, wherein when a silent mode is set, the controller stops output of the sound component.

4. The information processing system according to claim 1, wherein the information processing apparatus further includes a microphone which collects ambient sounds, and the controller determines intensity of the sound component based on intensity of sounds collected by the microphone.

5. An information processing apparatus comprising a controller, a speaker, a touch sensor, and a display, where the touch sensor and the display are superimposed on each other, wherein the controller supplies, to a digital pen, a drive signal obtained by synthesizing a vibration component and a sound component in response to contact of the digital pen with the touch sensor, the vibrator includes a conversion circuit and an actuator, the drive signal is supplied to the actuator through the conversion circuit, the controller determines output characteristics of the sound component based on an acoustic environment of the own apparatus, the actuator vibrates to independently produce each of the sound component and the vibration component, and when a sound volume from the speaker exceeds a predetermined reference volume greater than zero, the controller stops output of the sound component.

6. A non-transitory computer-readable recording medium storing a program causing a computer to function as the information processing apparatus according to claim 5.

7. A control method for an information processing system including an information processing apparatus and a digital pen, where the digital pen includes a vibrator, the information processing apparatus includes a touch sensor, a speaker, and a display, and the touch sensor and the display are superimposed on each other, the control method comprising:

a step of causing a controller of the information processing apparatus or the digital pen to supply, to the vibrator, a drive signal obtained by synthesizing a vibration component and a sound component in response to contact of the digital pen with the touch sensor; and a step of causing the controller to determine output characteristics of the sound component based on an acoustic environment of the information processing apparatus, wherein the vibrator includes a conversion circuit and an actuator, the drive signal is supplied to the actuator through the conversion circuit, the actuator vibrates to independently produce each of the sound component and the vibration component, and when a sound volume from the speaker exceeds a predetermined reference volume greater than zero, the controller stops output of the sound component.

8. The information processing system according to claim 1, wherein the sound component has a frequency of 200 Hz or more and the vibration component has a frequency of 200 Hz or less.

9. The information processing system according to claim 1, wherein the vibration component of the drive signal is synthesized based, at least in part, on an azimuth angle of the digital pen.

10. The information processing apparatus according to claim 5, wherein the sound component has a frequency of 200 Hz or more and the vibration component has a frequency of 200 Hz or less.

11. The information processing apparatus according to claim 5, wherein the vibration component of the drive signal is synthesized based, at least in part, on an azimuth angle of the digital pen.

12. The control method according to claim 7, wherein the sound component has a frequency of 200 Hz or more and the vibration component has a frequency of 200 Hz or less.

13. The control method according to claim 7, wherein the vibration component of the drive signal is synthesized based, at least in part, on an azimuth angle of the digital pen.

\* \* \* \* \*